United States Patent [19]
Tate

[11] 3,719,229
[45] March 6, 1973

[54] SECONDARY RECOVERY METHOD
[75] Inventor: Jack F. Tate, Houston, Tex.
[73] Assignee: Texaco Inc., New York, N.Y.
[22] Filed: June 21, 1971
[21] Appl. No.: 155,310

[52] U.S. Cl............166/271, 252/8.55 C, 252/8.55 D
[51] Int. Cl..........................E21b 43/22, E21b 43/27
[58] Field of Search......166/271, 259, 281, 282, 307; 252/8.55 B, 8.55 C, 8.55 D

[56] References Cited

UNITED STATES PATENTS

| | | | |
|---|---|---|---|
| 2,094,479 | 9/1937 | Vandergrift | 166/271 UX |
| 2,802,531 | 8/1957 | Cardwell et al. | 166/307 X |
| 2,885,004 | 5/1959 | Perry | 166/271 X |
| 3,021,279 | 2/1962 | Scanley | 252/8.55 C |
| 3,429,824 | 2/1969 | Tate | 252/8.55 B |
| 3,483,923 | 12/1969 | Darley | 166/271 |
| 3,488,289 | 1/1970 | Tate | 252/8.55 B X |
| 3,502,587 | 3/1970 | Stanford et al. | 252/8.55 B X |
| 3,616,852 | 11/1971 | Allen | 166/271 |

Primary Examiner—Stephen J. Novosad
Attorney—Thomas H. Whaley et al.

[57] ABSTRACT

Significant improvement in the recovery of hydrocarbons from a subterranean hydrocarbon-bearing formation containing acid-soluble components is accomplished by injecting into the formation via an injection well drilled into a formation communicating with an adjacent producing well and containing acid-soluble components which may or may not have water-sensitive clays and shales included therein, an aqueous acidic solution of a phosphate ester of prescribed formula whereupon the acid component reacts with the acid-soluble components of the formation creating passageways or enlarging existing passageways thus facilitating the flow of fluids therein and the phosphate ester prevents post precipitation of dissolved salts and thereby increases the recovery of hydrocarbons from the formation through the adjacent producing well.

17 Claims, No Drawings

SECONDARY RECOVERY METHOD

FIELD OF THE INVENTION

This invention relates to a method for the recovery of hydrocarbons from subterranean hydrocarbon-bearing formations containing acid-soluble components in which the permeability of the formation communicating between the producing well and adjacent injection well is increased by treating with an aqueous acidic solution of a phosphate ester of prescribed formula thereby facilitating the flow of fluids through the formation resulting in increased hydrocarbon recovery via the production well.

DESCRIPTION OF THE PRIOR ART

In recovering oil from oil-bearing reservoirs it usually is possible to recover only a minor part of the original oil in place by the primary recovery methods which utilize the natural forces present in the reservoir. As a result, a variety of supplemental recovery techniques have been utilized to increase the recovery of oil from subterranean hydrocarbon-bearing reservoirs or formations. Although these supplemental techniques are commonly referred to as secondary recovery operations in fact they may be primary or tertiary in sequence of employment. In such techniques, a fluid is introduced into the formation in order to displace the oil therein to a suitable production system through which the oil may be withdrawn to the surface of the earth. Examples of displacing media include gas, aqueous liquids such as fresh water or brine, oil-miscible liquids such as butane, or a water and oil-miscible liquid such as an alcohol. Generally, the most promising of the secondary recovery techniques is concerned with the injection into the formation of an aqueous flooding medium either alone or in combination with other fluids.

In the application of these conventional procedures for the production of hydrocarbons from similar formations by the secondary recovery method of water-injection, one of the principal difficulties that has been encountered is the generally low production response realized because of the low permeabilities and the consequent low rate of water acceptance of the communicating formation. Thus, these unfavorably low responses both in injection rate and in overall production have led to the abandonment of hydrocarbon production by water-injection methods from many carbonate formations after only a minimal amount of the oil-in-place has been produced.

One of the remedial measures that has been used frequently to increase water-injectivity in formations containing acid-soluble components is acid-treating of injection wells to improve the permeability surrounding the injection well bore, and thereby increasing the flow capabilities of the formation in the vicinity of the injection well bore. These measures, however, may result in only a temporary response in production improvement.

In acidizing an injection well utilizing the commonly employed procedure a non-oxidizing mineral acid, such as hydrochloric acid, is introduced into the injection well, and through the application of sufficient pressure is forced into the adjacent formation, where it reacts with the acid-soluble components, particularly the carbonates to dissolve them to form the respective salt of the acid, carbon dioxide and water, thereby increasing the permeability of the formation adjacent the bore of the injection well. The technique is not limited to application in formations of high acid solubility. Sandstone and gypsum-containing formations may require acidization of the injected water is unstable with respect to $CaCO_3$, $Fe(OH)_3$ or other salts.

If desired, the acidization may be carried out at an injection pressure sufficiently great to create fractures in the strata or formation which has the desired advantage of opening up passageways into the formation along which the acid can travel to more remote areas from the injection well bore. Conversely, fracturing a formation into which a displacing fluid is injected quite often is not desirable since sweep efficiency may be decreased. The salts formed upon neutralization of the acid are extensively water soluble and may pass through the formation dissolved in the displacing fluid.

There are, however, troublesome complications attending the use of hydrochloric acid, or other similar non-oxidizing mineral acids. In the acidizing process, the following primary beneficial reaction occurs: $CaCO_3 + 2HCl \rightarrow CaCl_2 + H_2O + CO_2\uparrow$. Under the higher pressures required to conduct an acidization, the $CO_2$ is dissolved in the reaction mixture consisting of spent acid and commate water: $CO_2 + H_2O \leftrightarrow H_2CO_3 \leftrightarrow H^+ + HCO_3^- \leftrightarrow 2H^+ + CO_3^=$. The equilibria may be summarized and written:

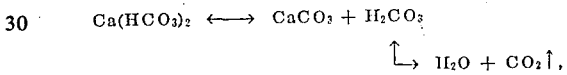

After acidization is complete, the well is often returned directly to injection, the reaction products of the dissolution being forced into the formation in a solution of the displacing fluid. As the fluid moves away from the well bore, pressure diminishes allowing dissolved gases such as $CO_2$ to break out of solution, inducing insoluble carbonates, such as $CaCO_3$ to post-precipitate.

Similarly, acid-dissolved iron salts may reprecipitate within the formation as hydrous iron oxides a distance from the well bore when pH rises due to exhaustion of the acid. In like manner, gypsum may precipitate if the injected fluid contains sulfate ion and if its temperature increases within the formation since the gypsum has an inverse solubility relationship. Precipitation of this type when it occurs within the capillaries of a tight formation can severely lessen the injection rate by plugging such capillaries.

It is known that molecularly dehydrated polyphosphates, are effective in retarding $CaCO_3$ precipitation. These polyphosphates are unsatisfactory in the method of the present invention because they undergo rapid hydrolysis in the presence of the mineral acid components. As a result, the scale inhibiting properties of these polyphosphates are destroyed. In addition, one hydrolytic reaction product, the phosphate ion ($PO_4^{-3}$), can precipitate with calcium $^{+2}$ or barium $^{+2}$ ions present in the produced water, causing additional plugging or scale deposition and they further aggravate the problem. The so-called "glassy" phosphates are known scale inhibitors. However, these glassy phosphates are unsatisfactory because of their slight solubility in acidic media and the tendency to form objectionable hydrolytic reaction products.

It is also known to employ various organic polymers to prevent the precipitation of the mineral salts. Many of these polymeric materials are unstable in mineral acids. In such acidic media they undergo spontaneous depolymerization to an ineffective species. A representative polymeric material which undergoes such hydrolysis in the presence of acids is polyacrylamide. In addition, this polymer has a further disadvantage in that it is unstable in aqueous media at temperatures of about 300° F. and upwards. Many wells that are being treated by the method of the present invention have bottom hole temperatures of 250°–300° F. or higher.

The chemically altered natural polymers and natural polymers themselves, are effective inhibitors to prevent the precipitation of mineral salts. However, many of these materials such as sodium carboxymethylcellulose precipitate or decompose in the presence of mineral acids. Other known sequestering agents such as citric or tartaric acids, and/or complexing agents such as ethylenediaminetetraacetic acid and its water-soluble salts are known inhibitors to prevent the deposition of boiler scale in aqueous media. However, such materials are not applicable in the method of the present invention because they are not appreciably surface active and do not adsorb on the formation face.

The primary object of the present invention is to provide a method for the improved recovery of hydrocarbon fluids from subterranean fluid-bearing formations wherein a composition comprising an aqueous acidic solution of a phosphate ester of prescribed formula is injected into a formation communicating between a producing well and an adjacent injection well, said formation containing acid-soluble components and in some instances also containing water-sensitive clays or shales, and whereafter the acid component of the said composition reacts with the acid-soluble components of the formation to increase permeability of the formation thereby facilitating the flow of fluids therethrough and the phosphate ester component prevents the post-precipitation of compounds formed by the reaction of the acidic component with the formation.

SUMMARY OF THE INVENTION

In accordance with the present invention, there is provided a new and improved method for the recovery of hydrocarbons from subterranean hydrocarbon-bearing formations in which there is injected into the formation via an injection well drilled into a formation communicating with an adjacent producing well and containing acid-soluble components which may or may not have water-sensitive clays included therein, a composition comprising an aqueous acidic solution of a phosphate ester of prescribed type which is capable of reacting with the acid-soluble components of the formation to increase the permeability and porosity thereof and the phosphate ester component prevents precipitation of compounds formed by the said reaction of the acid component thereby permitting a substantial increase of production of hydrocarbons from the formation via the production well.

An advantage resulting in treating subterranean hydrocarbon-bearing formations having acid-soluble components therein with the aqueous acidic solution of the phosphate ester is that the post-precipitation of acid-dissolved salts is prevented or materially decreased. Such post-precipitation, whether it be of carbonates from evolution of $CO_2$ from solution, hydrous iron oxides from a rise in pH, or of gypsum from an increase in formation temperature, can lead to plugging of formation capillaries and a consequent reduction of permeability. Such an event can reduce injectivity and accordingly the rate of production from adjacent wells.

DESCRIPTION OF THE INVENTION

The method of the present invention in its broadest embodiment comprises introducing via an injection well drilled into a hydrocarbon-bearing formation containing acid-soluble components and communicating with a producing well a fluid composition comprising an aqueous acidic solution of a phosphate ester of prescribed formula in amounts sufficient to react with the formation so as to increase substantially the flow capability of the formation and to thereafter produce hydrocarbons from the said subterranean formation at an increased rate through the production well.

The phosphate ester useful in preparing the aqueous acidic compositions of the present invention has the general formula

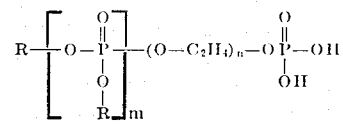

wherein R is either hydrogen or a $$C_{13}H_{27}O-(C_2H_4O)_{n-1}-C_2H_4$$

group in which n is 1 to 3, m is equal to 2 or 3, and R is a hydrogen atom not more than m minus one times, or a mixture of said esters, said ester having a molecular weight in the range of from about 750 to about 1730.

The phosphate esters in the composition of the present invention can be prepared in a known manner such as for example by ethoxylation of tridecanol and subsequent phosphorylation of the ethoxylated tridecanol.

The corresponding salts of the ester can be prepared by neutralization of the ester with caustic soda or potassium hydroxide.

A preferred ester is an ester having the structural formula

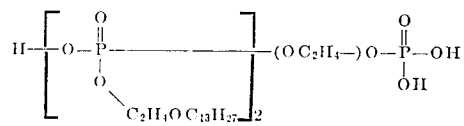

having a molecular weight of 754 and the empirical formula $C_{32}H_{69}O_{13}P_3$, or a mixture of said ester with an ester having the structural formula

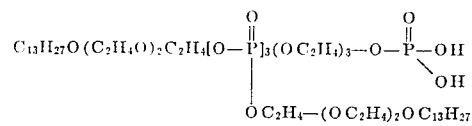

which has the empirical formula $$C_{82}H_{170}O_{28}P_4$$

The admixtures of esters may contain from about 30 to 70 percent by weight of the $C_{32}H_{69}O_{13}P_3$ ester and about 70 to 30 percent by weight of the $C_{82}H_{170}O_{28}P_4$ ester. A preferred range is about 40 to 60 percent of the $C_{32}$ ester and about 60 to 40 percent of the $C_{82}$ ester.

Preferably, the acidic aqueous treating composition of this invention injected into the hydrocarbon-bearing formation comprises an aqueous solution of from about 3 to about 30 percent, preferably 5 to 28 percent by weight of a non-oxidizing mineral acid, such as hydrochloric acid, etc., which contains dissolved therein between about 0.1 to about 2.5 percent by weight, preferably 0.3 to 1.5 percent based on the total solution weight of the phosphate ester.

The aqueous acidic solutions employed in the method of this invention, preferably contain an inhibitor to prevent or greatly reduce corrosion attack on metals. A variety of such inhibitors are known in the art, e.g., certain compounds of arsenic, nitrogen or sulfur as described by Grebe et al. in U.S. Pat. No. 1,877,504. Likewise, resin-amine type inhibitors, as illustrated in U.S. Pat. No. 2,758,970, may be utilized. A small but effective amount of the inhibitor is employed which generally ranges from about 0.02 percent to about 1.5 percent by weight of the aqueous solution.

In the first step of preparing the aqueous acidic composition of this invention, a solution containing from about 3 to about 30 percent by weight of a non-oxidizing mineral acid, such as hydrochloric acid, in water is prepared. An inhibitor to prevent corrosion on the metal equipment associated with the wells is usually added with mixing in the next step. The required amount of the phosphate ester is then admixed with the aqueous acidic solution.

The method of this invention can be carried out with a wide variety of injection and production systems which will comprise one or more wells penetrating the producing strata or formation. Such wells may be located and spaced in a variety of patterns which are well-known to those skilled in the art. For example, the so-called "line flood" pattern may be used, in which case the injection and producing systems are composed of rows of wells spaced from one another. The recovery zone, i.e., that portion of the producing formation from which hydrocarbons are displaced by the drive fluid to the production system, in this instance will be that part of the formation underlying the area between the spaced rows. Another pattern which is frequently used is the so-called "circular flood" in which the injection system comprises a central injection well while the production system comprises a plurality of production wells spaced about the injection well. Likewise, the injection and production systems each may consist of only a single well and here the recovery zone will be that part of the producing strata underlying an elliptical-like area between the two wells which is subject to the displacing action of the aqueous drive fluid. For a more elaborate description of such recovery patterns reference is made to Uren, L.C., Petroleum Production Engineering-Oil Field Exploitation, Second Edition, McGraw Hill Book Company, Inc., New York, 1939, and to U.S. Pat. Nos. 3,472,318 and 3,476,182.

In carrying out the method of this invention, the aqueous acidic solution of the phosphate ester is forced, usually via a suitable pumping system, down the well bore of an injection well and into the producing formation through which it is then displaced together with hydrocarbons of the formation in the direction of a production well. As those skilled in the art will readily understand, the pressure employed is determined by the nature of the formation, viscosity of the fluid, and other operating variables. The acidization method of this invention may be carried out at a pressure sufficient merely to penetrate the formation or it may be of sufficient magnitude to overcome the weight of the overburden and create fractures in the formation. Propping agents, to prop open the fractures as created, for example 20 to 60 mesh sand, in accordance with known fracturing procedures, may be employed in admixture with the aqueous acidic solution containing the cited phosphate ester.

The formation may be treated continuously with composition or such treatment may be temporary. If desired, however, after a time, conventional flooding may be resumed. The aqueous acidic solution of the phosphate ester also may be applied in a modified water flood operation in which there is first injected into the well bore a slug of the aqueous acidic solution of phosphate ester which is forced under pressure into the subterranean formation. This first step is then followed by a similar injection step wherein a slug of an aqueous drive fluid, such as water, is injected, which is thereafter followed by a repetition of the two steps. This sequence may be repeated to give a continuous cyclic process. The size of the slugs may be varied within rather wide limits and will depend on a number of conditions, including the thickness of the formation, its characteristics and the conditions for the subsequent injection of the aqueous drive medium.

In the method of this invention, the phosphate ester component of the composition provides means whereby ions produced by the reaction of the acid component with the formation having tendencies to precipitate as salts such as $CaCO_3$, hydrous iron oxide and $CaSO_4 \cdot 2H_2O$ combine with the phosphoric acid moiety to form a highly stable complex therewith so that solid calcium carbonate does not precipitate from the spent treating solution. This binding up of the aforementioned calcium ions from weakly ionizable compounds permits the formed ion-phosphoric acid ester complex to remain dissolved in the treating solution and pass through the formation pores. Further, the phosphate ester component of the composition provides means whereby the nucleation and growth of the solid itself is thwarted, so that solid salts do not precipitate from the spent treating solution. Finally, the phosphate ester component of the composition provides means whereby continuous protection against post-precipitation of salts is obtained for a considerable period of time subsequent to treatment due to continuous slow desorption of the component from the formation faces. In contrast, use of surfactants having merely dispersant and suspending properties and not possessing the capability of molecularly binding up these produced ions or thwarting the nucleation and growth of solid salts thereof will permit post-precipitation of said salts from such treating solution with the likelihood of plugging up the formation passageways during subsequent recovery of desirable formation hydrocarbons therethrough.

It should be understood that the concentration of the phosphate ester and the acid components of the composition are chosen to provide a displacing fluid of the desired rhelogical properties. Similarly, the appropriate phosphate ester is selected on the basis of the formation being treated as well as other operating conditions employed.

EXAMPLE I

Through a water injection well drilled into a limestone formation there is displaced under pressure down the tubing and into the formation an aqueous acidic solution containing 1 percent by weight based on the total weight of the solution of a phosphate ester sold under the trade name "Phosphonol T," dissolved in a 15 percent by weight aqueous solution of hydrochloric acid. The pressure required to inject the required volume of water declines considerably and no increase in said pressure is noted subsequent to treatment, indicating that post precipitation of $CaCO_3$ within the formation leading to permeability reduction is prevented or materially lessened. The well is then returned to conventional water injection. After about 30 days the production of hydrocarbons from an adjacent producing well is substantially increased.

The ester employed is a mixture of esters of polyphosphonic acids containing polyethoxy linkages partially esterified with alkoxypolyethoxyethanols. Such mixed esters on typical analysis analyzed 51.9 percent carbon, 9.7 percent hydrogen, 8.8 percent phosphorous and 29.6 percent oxygen (by difference). The apparent empirical formula is $C_{42}H_{95}P_3O_{18}$ and the mixture has a calculated molecular weight of 965. The neutralization number was found to be 253. NMR analysis showed the mixture to comprise highly branched alkylated ethoxylated acid phosphates containing a 5:1 ratio of ortho and pyro-phosphates. The ratio of ethylene oxide radical ($-CH_2-CH_2-O-$), tridecyl radical ($C_{13}H_{27}-$), and phosphate ester radical ($-CH_2-O-P=O$) are 3:1:1, respectively.

EXAMPLE II

A flooding operation is carried out in an oil-containing reservoir in accordance with the process of this invention. Four injection wells are arranged in a rectangular pattern around a single centrally located production well in this system. A slug consisting of 75 barrels of an aqueous acidic solution containing 0.8 percent by weight, based on the total weight of the solution, of the same phosphate ester as Example I, in a 15 percent by weight aqueous solution of hydrochloric acid, is displaced via each of the four injection wells into the formation at a rate of about 50 bbl/day. In the next step, 100 barrels of water are injected under pressure into the producing formation through each injection well at a rate of about 55 bbl/day. This sequence of operations is repeated numerous times and the result is an increased injection rate of the drive streams into the injection wells and a subsequent increase in the rate of production of hydrocarbons via the production well.

EXAMPLE III

An injection well in a formation containing about 30% HCl soluble material is treated with 500 gallons of conventional 15% HCl followed by 1500 gallons of 15% HCl containing 1% by weight of the same phosphate ester of Example I. The aqueous acidic phosphate ester composition is displaced from the tubing into the formation with lease water and the well shut in for 24 hours. Thereafter the well is returned to water injection. The injectivity of the well is materially increased for a sustained period of time resulting in enhanced hydrocarbon recovery.

Obviously, many modifications and variations of the inventions as hereinabove set forth may be made without departing from the spirit and scope thereof, and therefore only such limitations should be imposed as are indicated in the appended claims.

I claim:

1. A method for the recovery of hydrocarbons from a hydrocarbon-bearing formation containing acid-soluble components having at least one injection well and at least one production well penetrating the said formation and in fluid communication, which comprises displacing through the formation a composition comprising an aqueous acidic solution of a phosphate ester containing 3 to 30 percent by weight of a non-oxidizing mineral acid and 0.1 to 2.5 percent by weight of said phosphate ester, and recovering hydrocarbons through the production well, said phosphate ester having the general formula

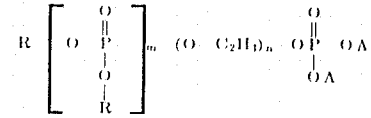

wherein R is either hydrogen or a $C_{13}H_{27}O-(C_2H_4O)_n$ $_{-1}-C_2H_4$ group in which $n$ is 1 to 3, $m$ is equal to 2 or 3 and R is a hydrogen atom not more than m minus one times, A is hydrogen or an alkali metal, said ester having a molecular weight in the range of from about 750 to about 1730.

2. Method as claimed in claim 1 wherein said ester has the formula

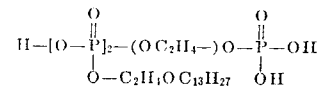

3. Method as claimed in claim 1 wherein said ester has the formula

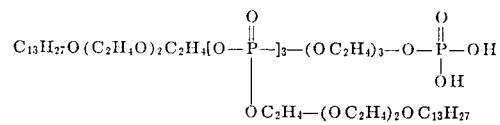

4. Method as claimed in claim 1 wherein said ester comprises a mixture of from about 30 to 70 percent by weight of a phosphate ester having the formula:

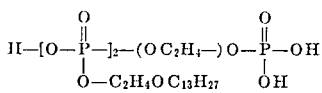

and from about 70 to 30 percent by weight of a phosphate ester having the formula:

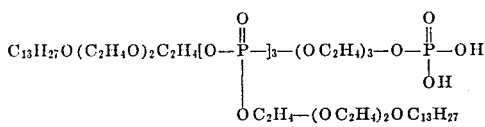

5. Method as claimed in claim 1 wherein said ester is present in the composition in an amount of from about 0.3 to 1.5 percent by weight.

6. Method as claimed in claim 1 wherein said ester is present in the form of the sodium salt.

7. Method as claimed in claim 1 wherein said acid is hydrochloric acid.

8. Method as claimed in claim 1 wherein said acid is sulfuric acid.

9. Method as claimed in claim 1 wherein said ester is dissolved in about 5 to about 20 percent by weight solution of the mineral acid.

10. Method as claimed in claim 1 wherein said solution is injected down the injection well bore penetrating said formation under a pressure greater than the formation pressure and sufficient to create fractures in the formation.

11. Method as claimed in claim 1 wherein said solution is injected down the well bore penetrating said formation under a pressure greater than formation pressure but less than the pressure required to create fractures in the formation.

12. A method for the recovery of hydrocarbons from a hydrocarbon-bearing formation containing acid-soluble components and having at least one injection well and at least one production well penetrating the said formation in fluid communication which comprises displacing through the formation a slug of a composition comprising an aqueous acidic solution of a phosphate ester containing 3 to 30 percent by weight of a non-oxidizing mineral acid and 0.1 to 2.5 percent by weight of said phosphate ester, said phosphate ester having the general formula:

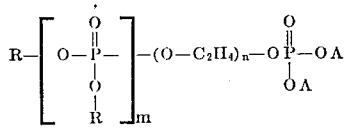

wherein R is either hydrogen or a $C_{13}H_{27}O-(C_2H_4O)_n-C_2H_4$ group in which $n$ is 1 to 3, $m$ is equal to 2 or 3 and R is a hydrogen atom not more than m minus one times, A is hydrogen or an alkali metal, said ester having a molecular weight in the range of from about 750 to about 1730, thereafter injecting a slug of an aqueous drive fluid into the formation to drive the said composition through said formation toward said production well and recovering hydrocarbons through the production well.

13. Method as claimed in claim 12 wherein said phosphate ester has the formula

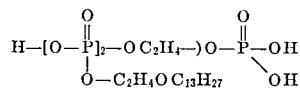

14. Method as claimed in claim 12 wherein the said phosphate ester has the formula

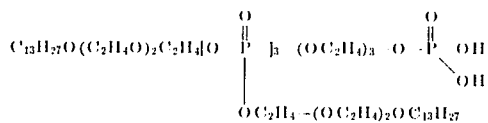

15. Method as claimed in claim 12 wherein said phosphate ester comprises a mixture of from about 30 to 70 percent by weight of the phosphate ester having the formula

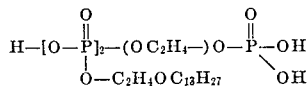

and from about 70 to 30 percent by weight of the phosphate ester of formula

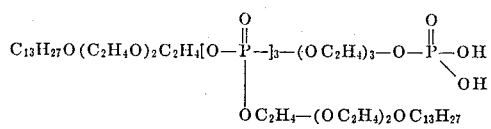

16. Method as claimed in claim 12 wherein said ester is present in the composition in a amount of from about 0.3 to 1.5 percent by weight.

17. Method as claimed in claim 12 wherein said ester is present in the form of the sodium salt.

* * * * *